United States Patent [19]

Bergman

[11] 4,046,288
[45] Sept. 6, 1977

[54] PLURAL CHAMBER DISPENSER

[76] Inventor: Carl Bergman, 2316 NE. 28th Court, Lighthouse Point, Fla. 33064

[21] Appl. No.: 656,087

[22] Filed: Feb. 6, 1976

[51] Int. Cl.² ............................................... B67D 5/42
[52] U.S. Cl. .................................... 222/135; 222/145; 222/390
[58] Field of Search ............... 222/135, 145, 390, 184, 222/142; 128/236; 401/172–175; 239/324; 259/18, 27

[56] References Cited

U.S. PATENT DOCUMENTS

| 2,485,467 | 10/1949 | Weisbaum | 222/390 |
| 3,728,035 | 4/1973 | Reitknecht | 401/175 |
| 3,774,816 | 11/1973 | Bratton | 222/145 X |
| 3,823,851 | 7/1974 | Waters | 222/146 HA |

Primary Examiner—Robert B. Reeves
Assistant Examiner—John P. Shannon

Attorney, Agent, or Firm—Cushman, Darby & Cushman

[57] ABSTRACT

A plurality, e.g., two, fluid product-containing cylinders are joined, side-by-side in a body, with their dispenser spouts adjoining one another. An operator assembly is fitted on the opposite end of the body and unites a cap, an operator, such as a handwheel, a helically threaded rod for each cylinder, a piston mounted on each rod for longitudinal travel upon rotation of the rod, a gear plate receiving a set of gears which interconnect the threaded rods with the operator, so that as the operator is turned, the pistons are advanced. Several assembly aids are shown. A variation is shown, wherein the situs of the spouts is displaced to an intermediate location on the front face of the body, so the body can be footed and thus supported upright, e.g., for use as a condiment dispenser.

Most of the principles of the invention are equally applicable to dispensers having only one chamber.

15 Claims, 7 Drawing Figures

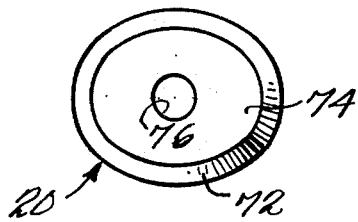
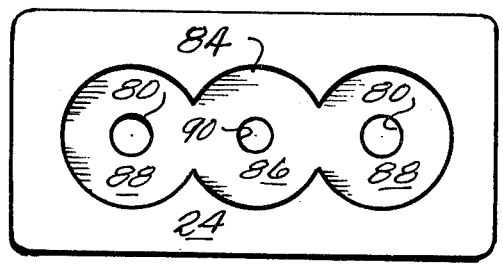
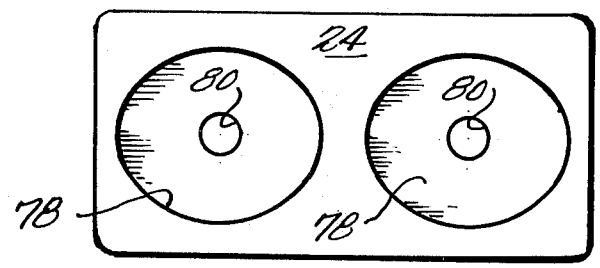
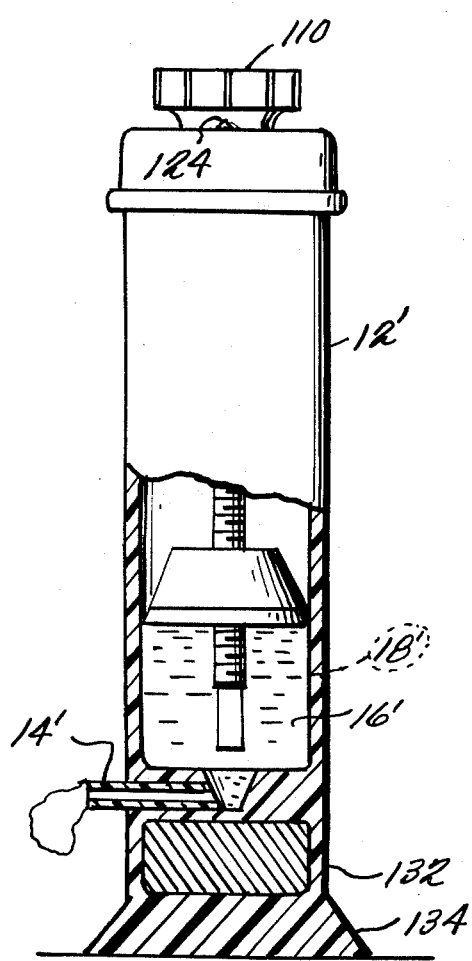
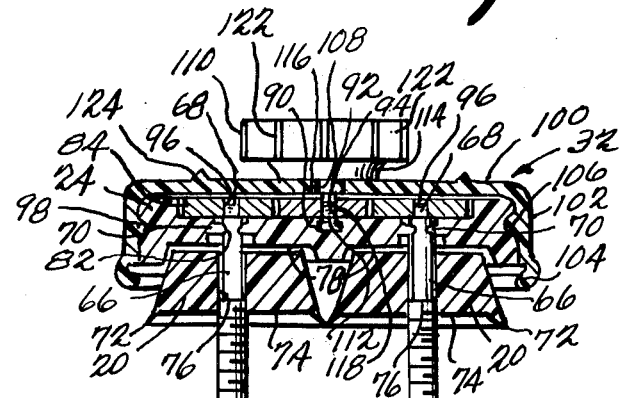
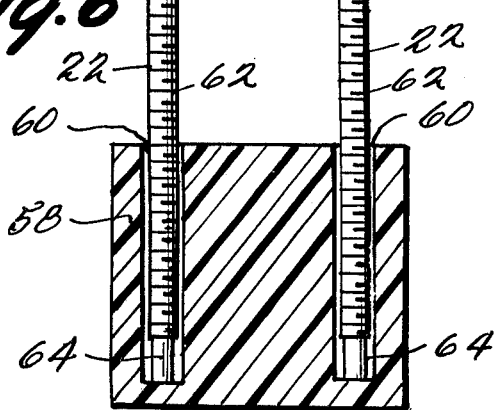

PLURAL CHAMBER DISPENSER

BACKGROUND OF THE INVENTION

In recent years the present inventor has been attempting to improve upon the design of containers or dispensers for two-component epoxy resin adhesives. One product of his early work is the design of dispenser disclosed in his co-pending U.S. Pat. application Ser. No. 537,332, filed Dec. 30, 1974 now U.S. Pat. No. 3,952,920. Although that design is believed to be an improvement in comparison with much of what has been marketed, experience and insight gained since that disperser was designed have led the present inventor to see that such a dispenser should be more compact, durable, easy to assemble and easy to adapt to dispensing different product than it is. This realization led to a redesign effort which has produced the present invention.

During the development of the new dispenser, the present inventor has become aware of the following patents of at least general interest to the subject:

| Patentee | Patent No. | Date of Issue |
|---|---|---|
| Thompson | 2,253,151 | August 19, 1941 |
| Maillard | 2,826,339 | March 11, 1958 |
| Herman et al | 3,117,696 | January 14, 1964 |
| Van Sciver II | 3,159,312 | December 1, 1964 |
| Nielsen | 3,166,221 | January 19, 1965 |
| Creighton, Jr. et al | 3,311,265 | March 28, 1967 |
| Creighton, Jr. et al | 3,323,682 | June 6, 1967 |
| James L. Cannon | 3,767,085 | October 23, 1973 |

It is common for dispensers for multi-component products such as two component epoxy resin adhesives to be sold in a filled condition, wherein the cylinders are largely full of product. Accordingly, the pistons are at the ends of the cylinders and the piston rods extend substantially from the cylinders. The pistons are pushed in as the product is dispensed, thus shortening the original length of the dispenser. The original length of the dispenser can be objectionable from two aspects. Firstly, the longer length of the dispenser necessitates a longer length of packaging, with attendant greater cost therefore. Secondly, the extended piston rods are vulnerable to being broken by bending stresses applied normally of the longitudinal axes thereof, for instance, when something heavy is dropped when its piston rods are fully extended.

SUMMARY OF THE INVENTION

A plurality, e.g., two fluid product-containing cylinders are joined, side-by-side in a body, with their dispenser spouts adjoining one another. An operator assembly is fitted on the opposite end of the body and unites a cap, an operator, such as a handwheel, a helically threaded rod for each cylinder, a piston mounted on each rod for longitudinal travel upon rotation of the rod, a gear plate receiving a set of gears which interconnect the threaded rods with the operator, so that as the operator is turned, the pistons are advanced. Several assembly aids are shown. A variation is shown, wherein the situs of the spouts is displaced to an intermediate location of the front face of the body, so that body can be footed and thus supported upright, e.g., for use as a condiment dispenser.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS IN THE DRAWINGS

FIG. 1 is a longitudinal sectional view of the dispenser of the presently preferred embodiment;
FIG. 2 is a plan view thereof;
FIG. 3 is a plan view of one of the pistons;
FIG. 4 is a top plan view of the gear plate;
FIG. 5 is a bottom plan view of the gear plate;
FIG. 6 is a longitudinal sectional view of an intermediate step in the assembly of the dispenser of FIGS. 1-5;
FIG. 7 is an end elevation view of a modified from of the dispenser, with a portion broken away and sectioned to expose details of interest.

DETAILED DESCRIPTION OF THE PRESENTLY PREFERRED EMBODIMENT

Figure 1:
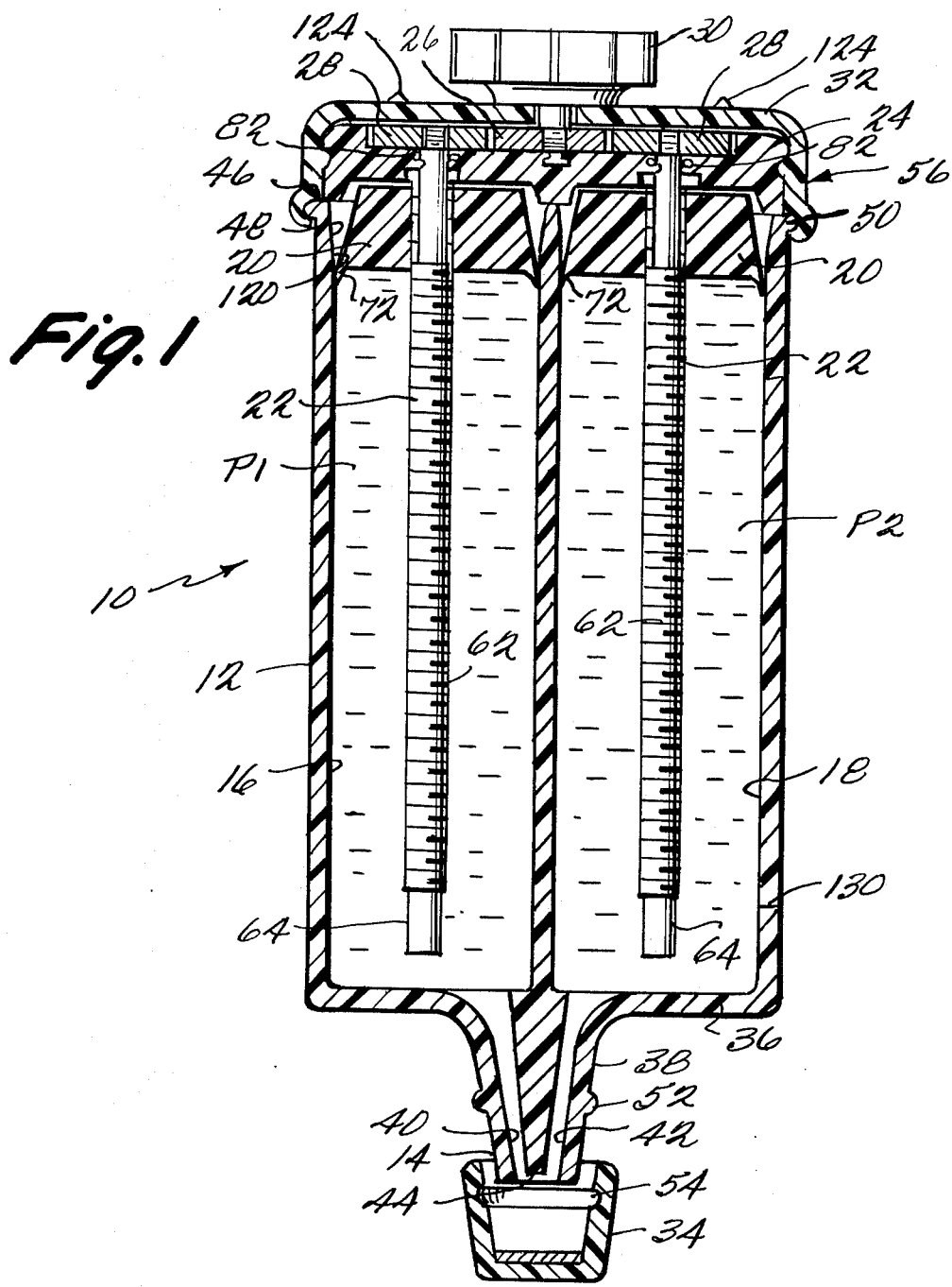
Figure 2:
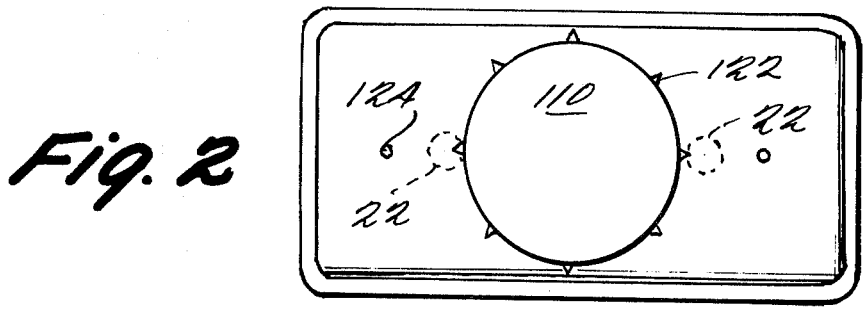

The dispenser 10 of FIGS. 1 - 6 includes a body 12 in the form of a bilumenal tube with a dispensing tip at 14. The two chambers 16, 18 each contain quanta of a fluent, plastic product P1, P2 ahead of a piston 20 threaded on a respective rod 22. The rods 22 are journalled in a plate 24 which also mounts gears 26, 28 which interconnect the rods 22 with a rotatable operator 30 positioned on the outside of a cover 32 for the opposite end of the body 12 from the tip 14. A cap 34 is provided for closing the dispensing tip 14. All of the components may be molded of common synthetic plastics material, taking care that the solvents used in any product P1 or P2 not be ones which will attack the dispenser and that, where a food product is to be contained, the plastics used to mold the dispenser components not include leachable deleterious substances.

To simultaneously dispense product P1 and P2 from the dispenser 10, the cap 30 is removed and the operator 30 is turned, rotating the gears 26, 28 and thus the rods 22. The pistons 20 and chambers 16, 18 are of corresponding non-circular transverse cross-sectional shape. Thus, when the rods 22 rotate, the pistons do not rotate, but each advance by an amount proportional to the amount the operator 30 is turned, thus dispensing a proportionate amount of product P1 and P2. Also, for whatever amount the operator 30 is turned, the ratio of amount of product P1 dispensed to the amount of product P2 dispensed is a constant.

Given the foregoing overview, the components will now be discussed more particularly.

The body 12 is preferably of flat, oval transverse cross-sectional shape, and the chambers 16, 18 are also each preferably of flat, oval shape, with the longest diameters of the body 12 and chambers 16, 18 all aligned. At one end, the body 12 includes an outer end wall 36 for the chambers 16, 18. The tip 14 is constituted by a narrower bore extension 38 of both the chambers 16, 18 through the wall 36. Within the extension 38, the respective passages 40, 42 gradually converge, until they unite at the tip 14. (Whether these passages meet at the tip, and how far the merger extends in the extension 38 depends on the nature of the products being dispensed. For instance, if P1 and P2 are the same, the merger can be effected quite early in the extension. However, if P1 and P2 react to produce a composition that will securely harden in place if the united part 44 of the passages 40, 42 is not cleaned out after each dispensing, the area 44 to be cleaned out should be made very short. Likewise the area 44 should be short if there is a desire to minimize intermixing of the two products P1, P2, for instance where the device 10 is to be used to lay down two side-by-side lines of different-colored cake frosting as decoration for a base layer of frosting).

Above the wall 36, the chambers 16, 18 are of substantially constant transverse cross-sectional, except for a short discontinuity at the opposite end 46. Near there, is an axially short circumferential (or perimetrical) band 48. The transverse cross-sections of the chambers 16, 18 gradually enlarge to the end 46 and an exterior, circumferential, radially outwardly projecting lip or flange 50 is provided at the end 46.

A circumferential bead or ring 52 is formed or mounted on the exterior of the extension 38 near the tip 14, shaped for retaining a push on-pull off or screw on-screw off cap 34. The latter is provided with a corresponding interior groove, ridge or other feature 54 for cooperation with the bead 52 to mount the cap in place.

The chambers 16, 18 may be filled with product P1, P2, while the end 46 is open, i.e., before the operator assembly 56 is installed. Although the device 10 was designed with dispensing a two-component (resin and catalyst) epoxy adhesive primarily in mind, other products may be contained. Examples include, but are not limited to, grease, glue, caulking compound, body solder, ketchup, mustard, cheese spread, toothpaste, medicinals, jellies, peanut butter and jelly, petroleum and hand creme. In these instances, both chambers 16, 18 may be the identical product, or different quanta of the same product which has been differently colored to produce a color contrast, or the chambers 16, 18 may produce substantially different products advantageously used in juxtaposition or admixture.

Assembly of the device 10 is best understood with reference to FIG. 6.

The preferred assembly technique makes use of a holder or jig 58, with a pair of upwardly open sockets 60 centered as far apart as the distance between centers of the two chambers 16, 18.

First, the lower end of a rod 22 is inserted in each socket 60. Although each rod is exteriorly helically threaded at 62 over most of its length, has an unthreaded, smaller diameter portion 64 adjacent its lower end and another at 66 adjacent its upper end, and ends at 68 in a peg of non-circular (e.g., square) transverse cross-section. A circumferential groove 70 is provided between the unthreaded portion 66 and the peg 68.

Next, a piston 20 is slipped over the upper end of each rod 22.

The pistons 20 are preferably each of generally frustoconical shape, except that the figure is somewhat flattened so that transverse cross-sections are oval rather than circular. These sections progressively increase in area toward the lower end of each piston and a thin, flexible circumferential flaring skirt 72 is formed at the lower end 74 of each piston. Further, each piston has a central vertical bore at 76 that is helically threaded for threaded engagement with the threading 62 on the rods 22. When the pistons 20 are slipped over the upper ends of the rods 22, they come to rest with the lower ends 74 at the level of the upper ends of the threaded portions 62. Next, a gear plate 24 is slipped over the upper end of the rods 22 and lowered until it comes to rest upon the pistons 20.

The plate is generally oval in figure. On its underside, it has two side-by-side recesses 78, which generally match the upper ends of the two pistons 20 in FIG, but are oversize, so that the piston upper portions are loosely received in the respective recesses 78. Centered in each recess 78 is a vertical bore 80 that includes an internal circumferential bead 82. When the gear plate is slipped over the piston rods, the plate is pushed down until the beads 82 snap into the grooves 70. The bores 80 are sufficiently larger in diameter than the rod portions 66 and the grooves than the beads 82, that when the gear plate has been snapped into place, the rods 22 remain freely rotatable.

On its upper side, the gear plate has a single recess 84 of three overlapped, lobes, including a central lobe 86 and two flanking lobes 88. The openings 80 proceed through the centers of the lobes 88. An upwardly open socket 90 is formed at the center of the central lobe 86. The socket 90 is provided with a circumferentially extending bead 92. At this stage, note that the pegs 68 lie within the recess lobes 88.

Next, a gear 26 is deposited in the recess lobe 86 and gears 28 are deposited in the respective recess lobes 88.

The gear 26 has teeth which mesh in a driving relation with the teeth of the gears 28 when the three gears are disposed in their respective recess lobes. Each gear 26, 28 has vertical bore 94, 96 of non-circular (e.g., square) transverse cross-sectional figure. Accordingly, the bores 96 receive the pegs 68, thus keying the gears 28 to the rods 22.

It should now be noticed that there is a circumferential radially outwardly opening 98 groove in the outer edge of the plate 24, intermediate the height of the plate.

The next step in assembling the operator assembly is to snap the cover 32 into place. The cover 32 has an upper end wall 100 and a peripheral, depending skirt 102. A circumferential, radially inwardly opening groove 104 is provided on the skirt 102 adjacent the lower end of the skirt. A radially inwardly projecting bead 106 is formed on the inner surface of the skirt intermediate the height thereof.

A vertical central opening 108 is provided through the end wall 100.

The cover 32 is positioned skirt downwards and pushed down into place over the gears and gear plate, until the bead 106 on the cover snaps in the groove 98. At this stage, the opening 108 lies in axial alignment with the bore 94 of the gear 26 and with the socket 90 in the gear plate 24.

Assembling of the operator assembly of FIG. 6 is completed by installation of the rotatable operator 30.

The operator 30 is shown having the form of a handwheel (more properly a "finger wheel") 110 which an integral shaft 112 projecting centrally downwards, merging with the wheel 110 at boss 114 of intermediate diameter. The shaft 112 has a portion 116 of non-circular (e.g., square) transverse cross-sectional figure and, below that, a circumferentially extending, radially outwardly opening groove 118. Installation involves lowering the operator 30, shaft 112 downwards going through the opening 108 in the cover 32, until the boss 114 rests on the cover, the shaft 112 non-circular portion 116 is engaged in the correspondingly non-circular opening 94 through the gear 26 and the bead 92 has snapped into the groove 118.

In practice, assembling of the operator assembly may be rapidly and reliably accomplished using mass production techniques, manually or with robot assistance.

The operator assembly of FIG. 6 is then lifted from the jig sockets and inserted down into a product-containing body 12, until the bead 50 snaps into the groove 104 on the lower end of the cover skirt. The free outer diameter of the flaring skirts 72 on the pistons 20 is greater than the diameters of the chambers 16, 18 and lower ends of the bands 48, but smaller than the diameters of the upper ends of the bands 48. Accordingly, as the operator assembly is lowered into the product-containing body 12, the skirts 72 are gradually resiliently deflected by sliding engagement with the band surfaces into sealing engagement with the chamber internal surfaces 120.

To jointly dispense product P1, P2, the cap 34 is removed and the wheel 30 is turned. This action rotates the gears and thus the shafts 22. Initial rotation of the shafts 22 causes the threading on the shafts to begin to engage with the internal threading on the pistons, pulling the pistons downwardly in the respective chambers and forcing equivalent amounts of product out the dispenser tip 14.

As the product is dispensed, the pistons are advanced downwards until they run out of threads at 64. At this point, the piston lower edges are adjacent the end wall 36 and the body 12 is substantially exhausted of product. Now, further turning of the operator 30 still rotates the rods 22, but there is no tendency for the pistons 20 to advance (such would tend to push the operator assembly back out of the body). .

The dispenser 10 when empty may be refilled, returned for cleaning and refilling or discarded, according to the program for its use.

By preference, a plurality of equi-angularly spaced ridges 122 are provided on the outer periphery of the operator wheel, so that a measured amount of product may be dispensed. For instance, if it is the case, the body 12 can be marked with indicia indicating that one-sixth of a turn of the operator will cause one gram of each product to be dispensed from the tip. One or more stationary protuberances or other indicators 124 may be provided on the outside of the cover beside the operator wheel, so the user may easily rotate the operator wheel, so the user may easily rotate the operator wheel through the desired angle.

It should be apparent that in most instances where a bead is formed on one part and a corresponding groove is formed on another part, that the bead and groove can be interchanged, inasmuch as it is the interdigitation of these members that is what is effective. Although these members have been referred to as extending circumferentially, in the instance where the parts are not strictly of circular section, the term should be understood to mean perimetrically. Although a bead or groove may need to extend circumferentially, where on or the other need not be angularly continuous, it can be formed of a series of discontinuous, lugs or grooves.

In the instance depicted, the lower ends of the rods 22 are freely suspended. If necessary, the non-threaded portions 64 could be extended, and ring-shaped protuberances formed on the inside of the end wall 36 to journal them.

For products which differ in viscosity flow rate and wheel power needed for advancing the pistons, appropriate modifications may be made in the size of the bores of the extension at the dispenser tip, the number of threads per unit length on the rods and the ratio of rotation provided between the operator wheel and the rods by the gears.

When the device 10 is not in use it may be capped and merely laid down, or it may be hung from an appropriately configured bracket, or it may be "stood on its head", i.e., the operator 30 wheel is relatively large, centrally located and flat, so the device can be supported thereupon.

The body 12, or at least a window 130 may be made of transparent or translucent material to permit the use to see how much product remains in the dispenser.

A modification is illustrated in FIG. 7 to permit the dispenser to function as a freestanding dispenser, for instance, for dispensing ketchup at the table. Simply, the tip 14' is angled forwards, so that it projects generally horizontally, and a faring 132, terminating in a base standard 134 is provided below the chambers 16', 18' of the body 12'.

The principles of the invention are equally applicable to dispensers having a larger number of product-containing chmabers than two, by replicating parts, and most are applicable to a one chamber dispenser.

It should now be apparent that the twist top dispenser as described hereinabove, posses each of the attributes set forth in the specification under the heading "Summary of the Invention" hereinbefore. Because the twist top dispenser can be modified to some extent without departing from the principles of the invention as they have been outlined and explained in this specification, the present invention should be understood as encompassing all such modifications as are within the spirit and scope of the following claims.

What is claimed is:

1. A plural chamber dispenser, comprising:
   a body having side wall means defining at least two side-by-side generally cylindrical chambers for containing a fluid product, each chamber having one end wall with a dispenser spout extending therethrough;
   an operator assembly fitted on the opposite end of the body,
   the operator assembly uniting: a cap; a rotatable operator outside the cap, a helically threaded rod for each chamber, an internally threaded piston mounted on each rod for longitudinal travel therealong upon rotation of the rod; a gear plate; a set of meshing gears received on said gear plate and rotatively connecting the operator through the cap, with the rods, so that as the operator is rotated, the pistons are advanced;
   and means on the cap and body securing the operator assembly on the body with the rods depending in the respective chambers;
   the operator assembly being a prefabricated unit, wherein:
   the rods each have a threaded main section flanked at the upper end by a smaller diameter unthreaded section and terminating at the upper end in a non-circular peg; the pistons being initially borne upon said unthreaded sections and the gear plate being provided with a plurality of operings, into which said pegs upwardly protrude; a three lobe recess formed in the upper side of the gear plate; the gears comprising at least three gears deposited, one each, in the recess lobes; each gear having a non-circular opening formed centrally therethrough; the operator including a handwheel having a shaft extending coaxially therefrom, said shaft having a portion of non-circular section, said shaft portion being inserted in the non-circular opening of one of said gears to key the operation to that gear; said pegs of said rods being received in the respective non-circular openings of the remainder of said gears to key the rods to those gears.

2. The dispenser of claim 1, further comprising:
said rods each having a second, smaller diameter unthreaded section flanking the lower end of the threaded main section thereof, so that when the pistons have been advanced downwards to the end that substantially all the product has been dispensed, the pistons run off the threaded main sections onto the second unthreaded sections.

3. The dispenser of claim 1, further comprising:
interengaged bead and groove means on the gear plates and the cap, which interengage to snap these parts together with the gears retained between the cap and gear plate.

4. The dispenser of claim 1, wherein:
the pistons are of generally frusto-conical shape, large end downwards, but of flatter than circular section, so as to have generally oval transverse cross-sections and the respective chambers being of corresponding section, to prevent rotation of the pistons as the rods rotate, thus restricting motion of the pistons to axial travel.

5. The dispenser of claim 4, further including a flexible, flaring circumferential skirt integrally provided on each piston at the larger, lower end thereof, for gasketing the pistons with respect to the chambers.

6. The dispenser of claim 5, wherein each chamber includes a tapering starting band portion having an upper diameter which is larger that the free diameter of the outside of the respective piston skirt and a lower diameter, like that of the remainder of the respective chamber, which is smaller than the free diameter of the respective piston skirt.

7. The dispenser of claim 1, further including:
an extension of said body uniting said dispenser spouts in a common, multiluminal member.

8. The dispenser of claim 7, wherein:
said extension proceeds axially of the body from the chambers, then turns through about 90° to end with a generally horizontally, forwardly directed tip; and further comprising:
foot means on the body below the chambers, for supporting the dispenser cap upwards in free-standing fashion.

9. A dispenser, comprising:
a body having side wall means defining at least one generally cylindrical chamber for containing a fluid product, each chamber having one end wall with a dispenser spout extending therethrough;
an operator assembly fitted on the opposite end of the body,
the operator assembly uniting: a cap; a rotatable operator outside the cap, a helically threaded rod for each chamber, an internally threaded piston mounted on each rod for longitudinal travel therealong upon rotation of the rod; a plate; means received on said plate and rotatively connecting the operator through the cap, with each rod, so that as the operator is rotated, each piston is advanced;
and means on the cap and body securing the operator assembly on the body with each depending in a respective said chamber:
the operator assembly being a prefabricated unit, wherein:
each said rod having a threaded main section flanked at the upper end by a smaller diameter unthreaded section and terminating at the upper end in a non-circular peg; each piston being initially borne upon the respective said unthreaded section and the plate being provided with at least one opening, into which each respective said peg upwardly protrudes; a recess formed in the upper side of the plate; the rotatively connecting means being deposited in said recess; the rotatively connecting means having a non-circular opening formed centrally therethrough; the operator including a handwheel having a shaft extending coaxially therefrom, said shaft having a portion of non-circular section, said shaft portion being inserted in the non-circular opening of said rotatively connecting means to key the operator to that means; said peg of said rod being received in the non-circular opening to key the rods to the rotatively connecting means.

10. The dispenser of claim 9, further comprising:
said rod having a second, smaller diameter unthreaded section flanking the lower end of the threaded main section thereof, so that when the piston has been advanced downwards to the end and substantially all the product has been dispensed, the piston runs off the threaded main section onto the second unthreaded section.

11. The dispenser of claim 9, further comprising:
interengaged bead and groove means on the plate and the cap, which interengage to snap these parts together with said rotatively connecting means retained between the cap and plate.

12. The dispenser of claim 9, wherein:
the piston is of generally frusto-conical shape, large end downwards, but of flatter-than-circular section, so as to have generally oval transverse cross-section and the chamber being of corresponding section, to prevent rotation of the pistons as the rod rotates, thus restricting motion of the piston to axial travel.

13. The dispenser of claim 9, further including a flexible, flaring circumferential skirt integrally provided on the piston at the larger, lower end thereof, for gasketing the piston with respect to the chamber.

14. The dispenser of claim 13, wherein the chamber includes a tapering starting band portion having an upper diameter which is larger than the free diameter of the outside of the respective piston skirt and a lower diameter, like that of the remainder of the respective chamber, which is smaller than the free diameter of the respective piston skirt.

15. The dispenser of claim 9, further including:
an extension of said dispenser spout, proceeding axially of the body from the chambers, then turning through about 90 degrees to end with a generally horizontally, forwardly directed tip; and further comprising:
foot means on the body below the chamber, for supporting the dispenser, cap upwards in free-standing fashion.

* * * * *